United States Patent
Krischer et al.

(10) Patent No.: US 7,562,224 B2
(45) Date of Patent: Jul. 14, 2009

(54) SYSTEM AND METHOD FOR MULTI-SESSION ESTABLISHMENT FOR A SINGLE DEVICE

(75) Inventors: Mark Krischer, Lanecove (AU); Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 828 days.

(21) Appl. No.: 11/098,253

(22) Filed: Apr. 4, 2005

(65) Prior Publication Data
US 2006/0236109 A1    Oct. 19, 2006

(51) Int. Cl.
*H04L 29/06* (2006.01)
*H04L 9/14* (2006.01)

(52) U.S. Cl. .................. 713/171; 380/272; 380/279; 713/153

(58) Field of Classification Search ............. 713/171, 713/168, 155, 153; 726/1–10; 380/282, 380/279, 272
See application file for complete search history.

(56) References Cited

U.S. PATENT DOCUMENTS

| | | | |
|---|---|---|---|
| 7,213,145 B2 * | 5/2007 | Sasmazel | 713/153 |
| 2003/0163733 A1 | 8/2003 | Barriga-Caceres et al. | |
| 2004/0054905 A1 * | 3/2004 | Reader | 713/171 |
| 2005/0254653 A1 * | 11/2005 | Potashnik et al. | 380/270 |
| 2007/0064647 A1 * | 3/2007 | Prasad | 370/331 |

OTHER PUBLICATIONS

Cisco. Wireless LAN Security. 2003. p. 23. http://www.cisco.at/reseller/2005_02/Tlatzer_LAN_Security.pdf.*

* cited by examiner

*Primary Examiner*—Gilberto Barron, Jr.
*Assistant Examiner*—Martin Jeriko P San Juan
(74) *Attorney, Agent, or Firm*—Tucker Ellis & West LLP

(57) ABSTRACT

A system and method that allows a device to complete a single complete authentication sequence to a AAA server resulting in as many secure sessions required for the different applications or subsystems determined by the client's identity and the AAA server's policy. As the device is authenticated, it is determined where there are other sessions for the device. The sessions are established by generating unique new keying material that is passed to each session. This can be accomplished by (a) the authenticator or AAA server issuing the keys and distributing them to both the supplicant and applications (via their authenticators); or (b) authenticator or the AAA server mutually generating the session unique keys with the supplicant that are then distributed to the applications (via their authenticators).

9 Claims, 4 Drawing Sheets

SYSTEM AND METHOD FOR MULTI-SESSION ESTABLISHMENT FOR A SINGLE DEVICE

BACKGROUND OF THE INVENTION

The present invention relates generally to network security and more specifically for a system and method to enable a single device to establish multiple sessions with a single login.

Network security has become a business critical issue. As a result, there is a need for different applications and systems to authenticate to one another. These authentications occur in an isolated context and result in the establishment of multiple, secure, authenticated sessions.

For example, in the wireless context, an access point may run several different applications or subsystems. As a result, there is a need for the access point to authenticate several times. When multiplied across a network comprising hundreds of access points, this can significantly load the AAA (Authentication, Authorization and Accounting) servers.

Existing single sign-on systems tend to be an optimization on the user side, eliminating the need for the user to continuously log into different applications by hiding subsequent authentications from the user. Typically, the user performs a single login to "unlock" access to secure credentials. These credentials are then used by the single sign-on system to authenticate the user to other applications as required. For example, Kerberos, available from the Massachusetts Institute of Technology and many other commercial products, authenticate a user to a ticketing server. The user requests tickets for each application the user would like to use. When the user starts an application, the tickets are used to establish a secure session with each application by the single sign-on system. The user's device submits the ticket to the authenticator for the application, the authenticator then authenticates the ticket with the ticketing server. Thus, the device is still performing multiple authentications, even though authentications to applications are hidden from the user by the single sign-on system.

BRIEF SUMMARY OF THE INVENTION

In accordance with an aspect of the present invention, there is described herein a system and method that allows a device to complete a single successful authentication sequence to a AAA server resulting in as many secure sessions for the different applications or subsystems, for example as determined by either the client's identity, the AAA server's policy, the client's (e.g., AP's) configuration at the time of initialization or any combination thereof.

In accordance with an aspect of the present invention, there is described herein a method to optimize authenticated multi-session establishment for a single supplicant. The method comprises authenticating the supplicant with an authentication server and determining at least one other session for the supplicant. The authentication server initiates the at least one other session for the supplicant with an authenticator for the at least one other session. Aspects of the present invention include systems and computer readable medium of instructions for implementing a methodology described herein.

An aspect of the present invention is that it allows an additional subsystem on a device to immediately begin operating over the authenticated, secure session without the need for a full authentication exchange, thus reducing AAA server traffic.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
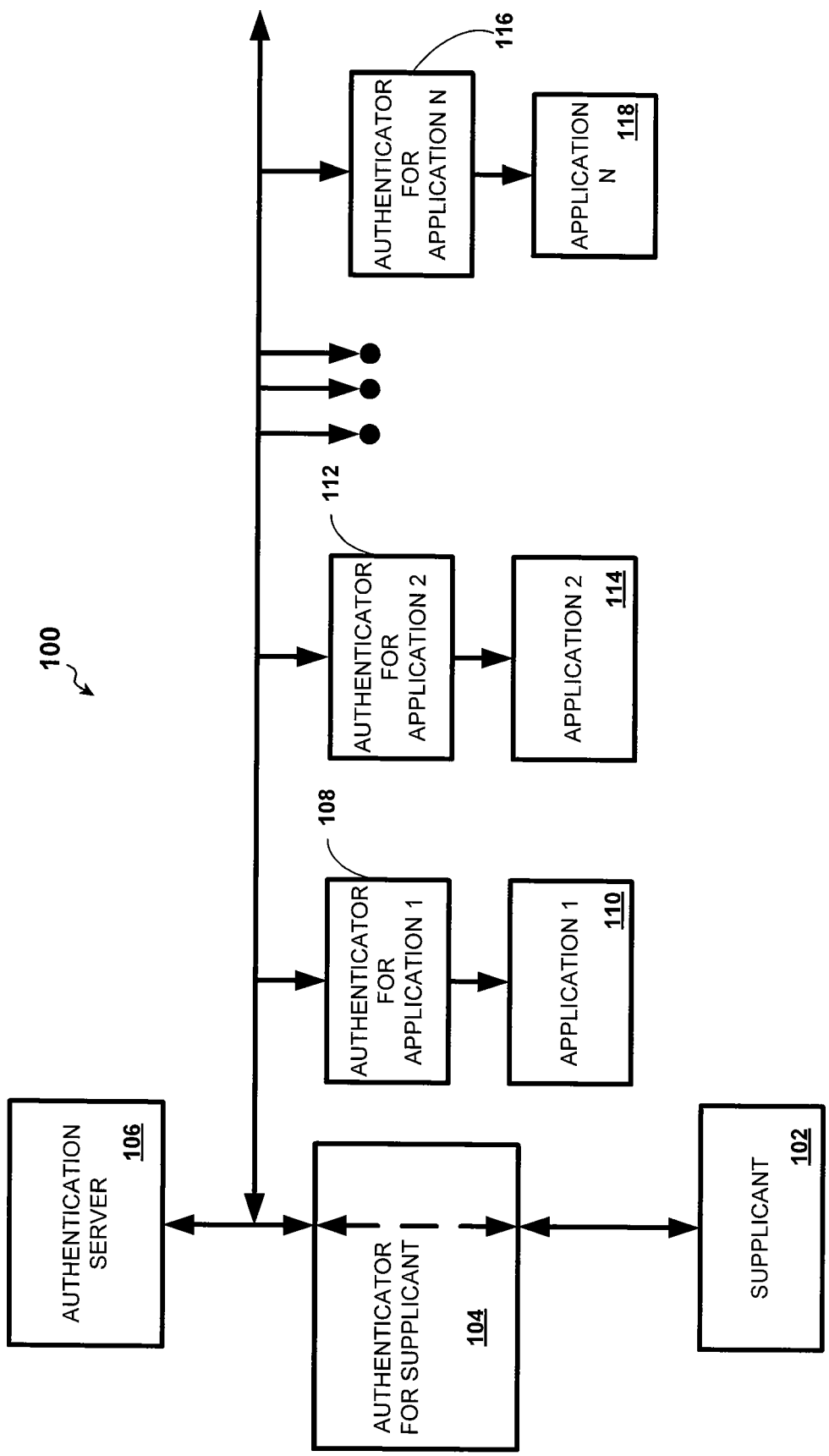
FIG. 1 is a block diagram of a system in accordance with an aspect of the present invention.

Throughout this description, the preferred embodiment and examples shown should be considered as exemplars, rather than limitations, of the present invention. The present invention provides a solution for providing securely authenticated multi-session establishment for a single device, eliminating the need for several redundant authentication exchanges. A device completes a single complete authentication sequence to a AAA server resulting in as many secure sessions required for the different applications or subsystems determined by the client's identity and the AAA server's policy. As the device is authenticated, the AAA server determines other sessions for the device. The AAA server generates session keys for the other sessions, sending one key to the other session and a corresponding key to the device, enabling the device to begin operating over the authenticated secure session without the need for a full authentication exchange.

The supplicant device is configured with logic to make it aware of the different subsystems it maintains, some of which may require authentication, as well as their relative priorities. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

When the supplicant begins the authenticated session establishment for the pre-defined "initial" subsystem, a list of additional authenticated sessions is employed to indicate the additional sessions. In one embodiment, the list is appended by the supplicant during login to the authentication server. In another embodiment, the list is stored at the authentication server.

The AAA server is configured with logic to recognize the list of additional sessions for the supplicant. The AAA server is responsive to the list to send additional session keys to the authenticator for the additional sessions. The AAA server will also send a session key to the supplicant and initial authenticator, which may be sent concurrently or separately from the session keys for the additional sessions.

Authenticators are configured with logic to handle session establishment when prompted by the AAA server, such as in the form of a session key, rather than in the form of an authentication request from the supplicant. This allows additional subsystems on the device to immediately begin operating using an authenticated, secure session while obviating the need for a full authentication exchange.

An aspect of the present invention is that it reduces the load to the device performing the authentications as well as the load on the AAA server, which must perform the authentication for each session. The present invention also reduces the number of messages required to handle all the authentication sequences thereby reducing network traffic as well.

Referring now to FIG. 1, there is illustrated a block diagram of a system 100 in accordance with an aspect of the present invention. Supplicant 102 communicates bi-directionally with authenticator 104. In a preferred embodiment, supplicant 102 is a client desiring access to a network via authenticator 104. Authenticator 104 communicates bi-directionally with authentication server 106. In a preferred embodiment, authentication server 106 is an AAA (Authentication, Authorization and Accounting) server, such as a RADIUS (Remote Authentication Dial-In User Service, RFC 2865) server. In addition, either authenticator 104, authentication server 106 or both bi-directionally communicates with authenticators 108, 112 . . . and 116 for additional application 1, 110, application 2, 114 . . . and application N, 118 respectively. From a logical perspective, each application has its own authenticator. However, for applications that are co-located on the same device it is possible, but not necessary, for the authenticators to be the same code running on the same box, having individual contexts for each separate authentication session.

When supplicant 102 first connects with the network, authenticator 104 has logic that only allows authentication request messages to be passed between supplicant 102 and authentication server 106. Until supplicant 102 is authenticated, sessions with application 1, 110, application 2, 114, . . . , application N, 118, are inhibited by logic in the authenticator 104. When authentication server 106 authenticates supplicant 102, logic in the authentication server sends keying material for the session to authenticator 104 and supplicant 102.

In addition, either concurrent with the authentication process or as a separate process, logic in authentication server 106 determines at least one other session for supplicant 102, e.g., application 1, 110 application 2, 114, . . . , application N, 118. In one embodiment, logic in supplicant sends a list of additional sessions to the authentication server 106, for example added as Information Elements (IEs) as part of the message. Alternatively, authentication server 106 utilizes logic to retrieve a database entry for the server from a database accessible to the authentication server. The database preferably resides on authentication server 106, but can reside elsewhere.

There are several ways in which the sessions are generated from a single authentication contemplated by the present invention. The present invention contemplates that the method and means employed are understood by both the supplicant and the network infrastructure. Thus, the supplicant signals either authenticator 104 or authentication server 106 that it desires to establish these multiple sessions. Alternative embodiments are based upon whether the policy decision is made by authenticator 104 or the authentication server 106. But the logic is the same, that is, in the case of the supplicant being the AP, the AP must signal agreement of this through an added element to the 802.1X EAP authentication, the EAP method itself or it can be implicitly understood that all it's authentications will yield the multiple sessions. Authenticator 104 or authentication server 106 confirm that the AP is authorized to establish the multiple sessions before it initiates the multi-session establishment.

As authentication server 106 determines there is at least one other session for supplicant 102, authentication server 106 initiates a session with an authenticator for the at least one other session, such as an authenticator 108 for application 1, 110, authenticator 112 for application 2, 114, . . . , and authenticator 116 for application N, 118.

Figure 2:
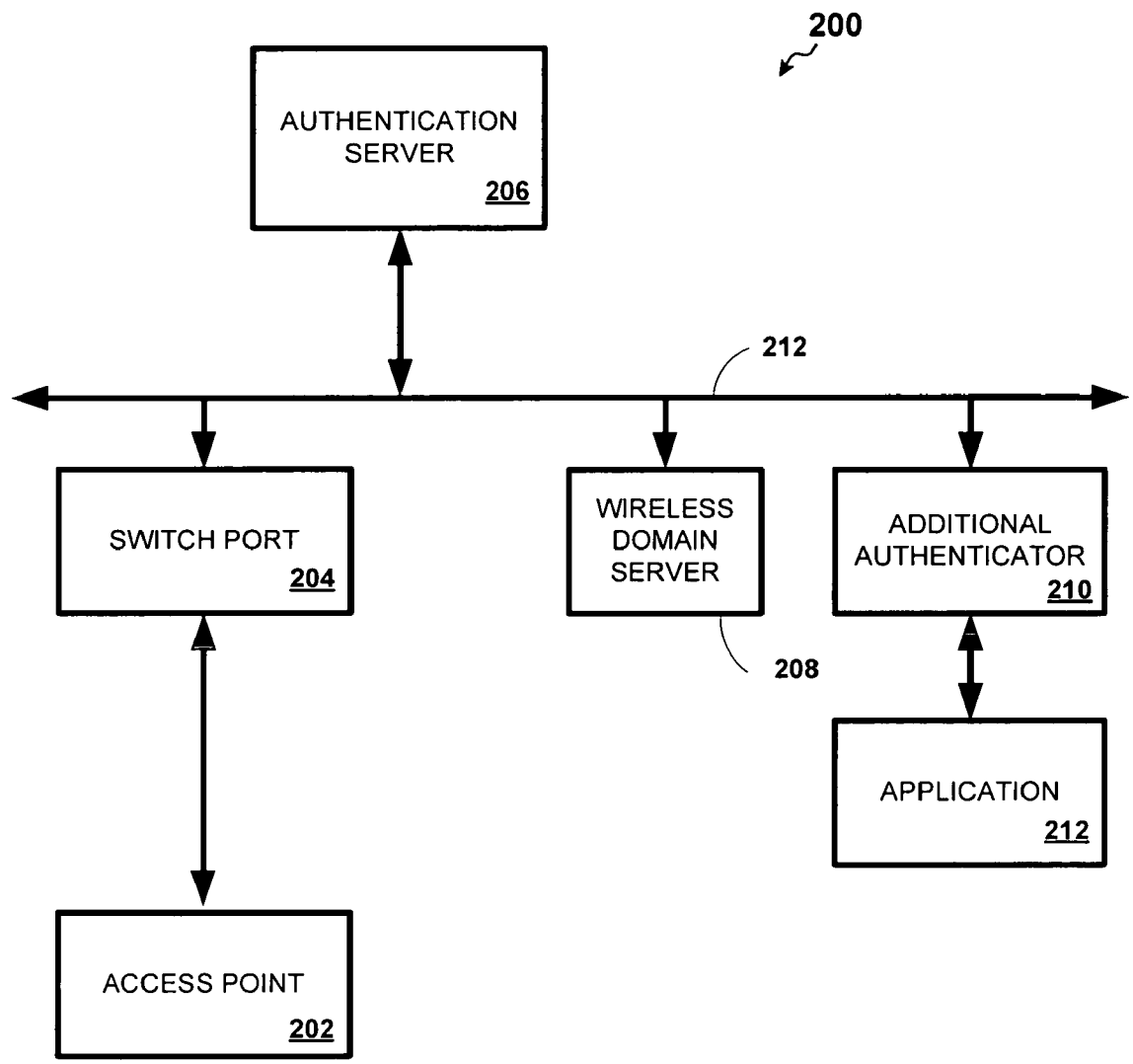
FIG. 2 is a block diagram of a wireless local area network in accordance with a preferred embodiment of the present invention.

The sessions are established by generating unique new keying material that is passed to each session. This can be accomplished by (a) the authenticator 104 or authentication server 106 issues the keys and distributes them to both the supplicant and applications (via their authenticators); or (b) authenticator 104 or authentication server 106 mutually generate the session unique keys with the supplicant (for example an AP as shown in FIG. 2) that are then distributed to the applications (via their authenticators).

For the former case where keys are derived by an endpoint, the endpoint may be supplicant 102, authentication server 106 (e.g., an AS) or authenticator 104 (e.g., a WDS). For the case where the endpoint is the supplicant 102, the supplicant 102 will signal after a successful authentication the keys it wishes to use with each application. An example of how this may be achieved with, for example, using EAP-FAST, would be to further ensue in EAP-TLV request response exchanges between the supplicant 102 and the authentication server 106 wherein the EAP-TLV request the supplicant provide all the session keys, each mapped to the specific application. Each key shall be keywrapped using the "master session key" or keying material mutually derived by the supplicant 102 and authentication server 106. Note that the EAP-TLV exchange is protected by the EAP-FAST tunnel. The authentication server 106 then decrypts the EAP-TLV as well as the applications and corresponding session keys. For each application, authentication server 106 shall then keywrap its corresponding session key for that supplicant using a shared secret it holds with the application and distribute the key. It shall do this for each application for which the supplicant has defined and the authentication server 106 has verified is authorized to establish the initiate session.

For the case where authentication server 106 generates the session keys for both supplicant 102 and authenticator 104, then authentication server 106 and supplicant 102 must retain the conversation used to authenticate to further provision these keys to the supplicant 102. Authentication server 106 will use the shared secret it shares with each application to keywrap the generated session key corresponding to the particular application and supplicant and distribute it to the application. Similarly, it shall keywrap the session key and application identifier and distribute this information in the conversation it still holds (for authenticating) with the supplicant.

For the latter case where keys are mutually derived, as an example, when using EAP authentication with methods such as EAP-TLS, PEAP and EAP-FAST where keying material is generated, this keying material can be used to generate cryptographically unique keys for each session. In these methods, the master secret key (per RFC 3748) or the EMSK (per draft-ieff-eap-keying-01.txt) to generate cryptographically unique keys for each application as follows:

Given a master shared secret (MSK) from the resulting successful EAP method for each application including the "master" or originating application, named app1 thru appn, their session keys can be generated as follows:

App1-session-key=hmac-sha1 (msk, "Unique <unique application name here> session key derivation" ||App1-identity|| Supplicant-identity || <length of concatenated string>)

Appn-session-key=hmac-sha1 (msk, "Unique <name the application n> session key derivation" ||App1-identity|| Supplicant-identity <length of concatenated string>)

Where || denotes concatenation

Where <unique application name here> is a unique lable identifier for that application and must be distinct from all other applications Where <length of concatenated string> is the total length of the string generated by the concatenations.

FIG. 2 is a block diagram of a wireless local area network 200 in accordance with a preferred embodiment of the present invention. As shown, access point 202 is the supplicant and switch port 204 is the authenticator for access point 202. Switch port 204 communicates bi-directionally with access point 202. Switch port 204 couples access point 202 to the backbone network 212. Backbone network 212 is suitably any wired network topology, wireless network topology, or combination thereof.

When access point 202 first desires to connect to network 212, it is authenticated by switch port 204 with authentication server 206. Until access point 202 is authenticated, switch port 204 exchanges authentication messages between access point 202 and authentication server 206 and blocks access point 202 from communicating with anything else connected to network 212.

Upon successfully authenticating access point 202, authentication server 206 generates a session key for communications between wireless switch 204 and access point 202. In a preferred embodiment, authentication server 206 also generates session keys for communications between access point 202 and wireless domain server 208.

Additionally, in accordance with an aspect of the present invention, authentication server 206 determines whether access point 202 should be authenticated with other applications coupled to network 212, such as application 212, which is authenticated by additional authenticator 210.

In operation, the 'central' or main authenticator, which is in this example is authentication server 206, determines which "applications" it may also need to establish sessions for access point 202. Access point 202 is first authenticated to WDS (wireless domain server, or controller) 208. However access point 202 is also authenticated to the switch port 204 that it is connected to as well as other servers it may need to establish sessions (such as a call manager or DHCP server, etc).

In a preferred embodiment, authentication server 206 is responsive to receive a list of additional sessions from access point 202, e.g., via an IE. In another preferred embodiment, authentication server 206 accesses a database to determine additional sessions.

For example, when authentication server 206 determines that access point 202 should establish a session with additional authenticator 210, authentication server 206 generates a session key the session between access point 202 and additional authenticator 210. Preferably, authentication server 206 determines the session between access point 202 and additional authenticator 210 during the authentication of access point 202. This would enable authentication server to send a single communication to access point 202 comprising a session key for switch port 204, a session key for wireless domain server 208, and a session key for additional authenticator 210. Authentication server 206 also sends session keys to switch port 204, wireless domain server 208 and additional authenticator 210 for access point 202.

Additional authenticator 210 is configured with logic that is responsive to receiving a session key from authentication server 206 to establish an authenticated, secure session with access point 202. This allows additional subsystems on access point 202 to immediately begin operating using an authenticated, secure session while obviating the need for a full authentication exchange with additional authenticator 210.

Although the above example illustrates the process for establishing multiple sessions for an access point, those skilled in the art can readily appreciate that the same process is adaptable for establishing multiple sessions for any device utilizing network 212. For example, the process can be used by a client (not shown) associating with access point 202, wherein access point 202 acts as the authenticator. As another example, the process can be used when authenticating switch port 204, or wireless domain server 208.

Figure 3:
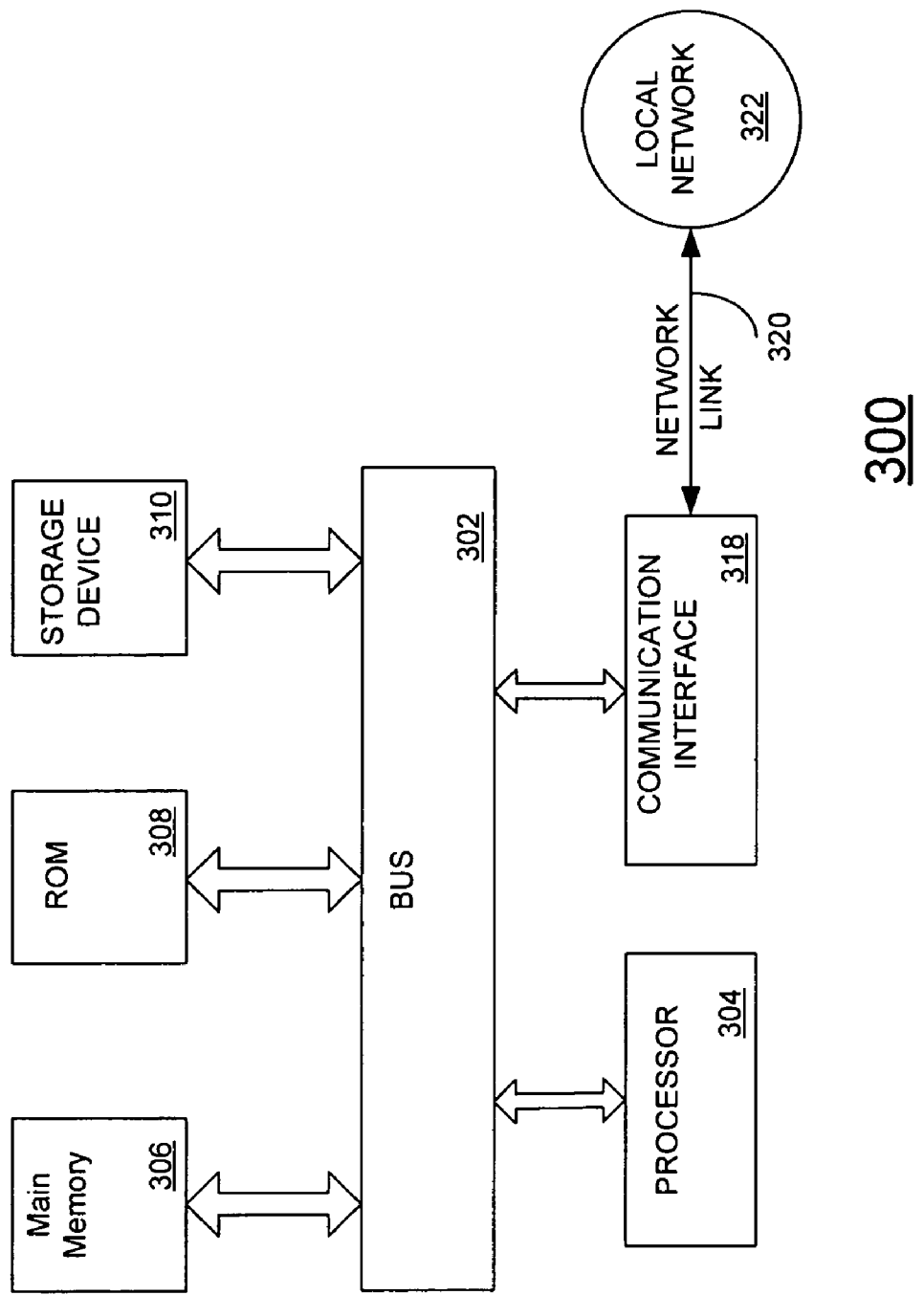
FIG. 3 is a block diagram of a computer system for implementing an aspect of the present invention.

FIG. 3 is a block diagram of a computer system 300 for implementing an aspect of the present invention. For example, computer system 300 is suitable to be employed by at least one of supplicant 102, authenticator 104, authentication server 106, application 1, 108, application 2, 110, . . . , and application N, 112 of FIG. 1, and, access point 202, switch port 204, authentication server 206, wireless domain server 208 and additional authenticator 210 of FIG. 2.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the invention is related to the use of computer system 300 for multi-session establishment for a single client. According to one embodiment of the invention, multi-session establishment for a single device is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry or an ASIC may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to other computers (not shown).

Computer system 300 can send messages and receive data, including program codes, network link 320, and communication interface 318. The received code may be executed by processor 304 as it is received, and/or stored in storage device 310, or other non-volatile storage for later execution. In this manner, computer system 300 may obtain application code in the form of a carrier wave.

Figure 4:
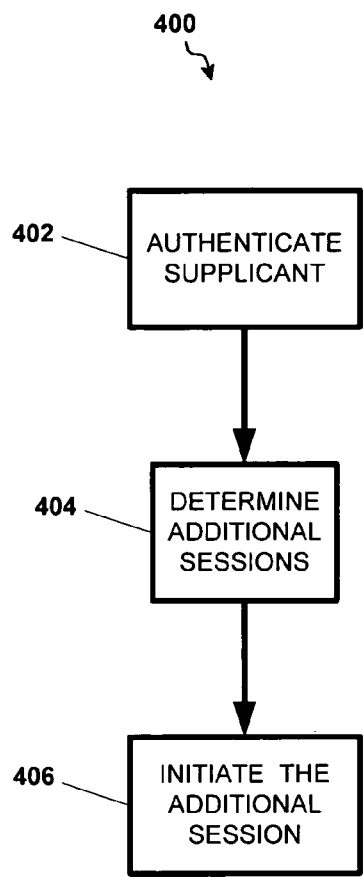
FIG. 4 is a block diagram of a methodology in accordance with an aspect of the present invention.
Figure 5:
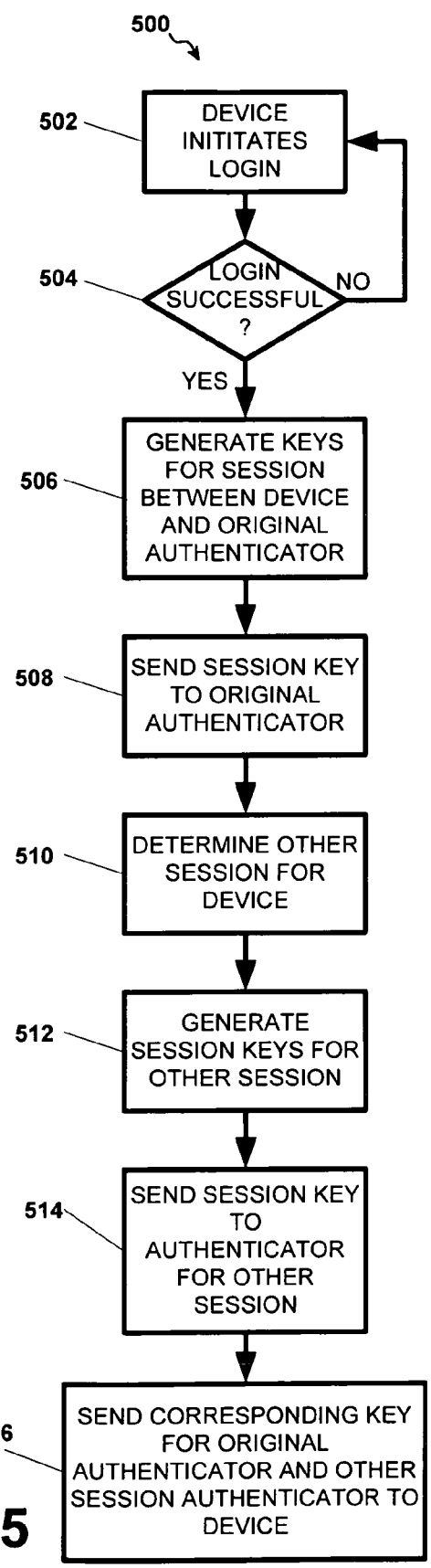
FIG. 5 is a detailed block diagram of a methodology in accordance with an aspect of the present invention.

In view of the foregoing structural and functional features described above, a methodology in accordance with various aspects of the present invention will be better appreciated with reference to FIGS. 4 and 5. While, for purposes of simplicity of explanation, the methodology of FIGS. 4 and 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 4 is a block diagram of a methodology 400 to optimize authenticated multi-session establishment for a single supplicant in accordance with an aspect of the present invention. At 402, the supplicant is authenticated with an authentication server. For example, a supplicant initiates a session with an authenticator, the authenticator passing authentication messages between the supplicant and the authentication server to enable the supplicant to be authenticated by the authentication server.

At 404, it is determined whether there are any additional sessions for the supplicant. To determine the additional sessions, the supplicant may send a list of potential additional sessions to the authentication server, or the authentication server accesses a database containing session information for the supplicant.

At 406, the authentication server initiates the additional session for the supplicant with an authenticator for the additional session. The initiating comprises generating a session key pair for the session between the supplicant and the additional session, sending one of the session key pair to the supplicant and the other to the authenticator for the additional session. The authenticator for the additional session is responsive to receiving the key from the authentication server to establish an authenticated, secure session with the supplicant without additional authentication steps.

In a preferred embodiment, the authenticator for the additional session has already been authenticated with the authentication server. Otherwise, the authentication server authenticates the authenticator for the additional session.

In a preferred embodiment, the supplicant receives the key for its authenticator and the authenticator for the additional session at the same time. This minimizes the amount of traffic between the supplicant and the authentication server.

FIG. 5 is a detailed block diagram of a methodology 500 to optimize authenticated multi-session establishment for a single device in accordance with an aspect of the present invention. Methodology 500 begins at 502 when the device initiates login with its authenticator. The authenticator enables communication between the device and an authentication server, and inhibits the device from other communications until the device is authenticated. If at 504 it is determined that the logon was not successful (NO), processing returns to 502. Otherwise, at 504 logon was successful (YES), the processing continues to 506.

At 506, the session between the device and the original authenticator is established and session keys are generated for the session between the device and the original authenticator. At 508, a session key is sent to the original authenticator.

At 510, the authentication server determines that there is another session for the device. One technique for determining whether there is another session for the device is for the device to send a list to the authentication server of additional sessions, or potential additional sessions. Another technique for determining whether there is another session for the device is to access a database or other record storage system by the authentication server. In one embodiment, the database resides on the authentication server, in another embodiment it resides elsewhere on the network.

At 512, session keys for the other session are generated. At 514, the session key for the other session is sent to the authenticator for the other session. In accordance with an aspect of the present invention, the authenticator for the other session is responsive to receipt of the session key to establishing an authenticated, secure session with the device. This enables the device to immediately communicate with the other session without any additional authentication between the device and the authenticator of the other session. After the session key for the other session has been delivered, the device communicates with the authenticator for the other session using its corresponding session key for the other session. For added security, the authenticator for the other session should be authenticated with the authentication server. This allows the authenticator to ensure that the key received from the authentication server is from a trusted source. Preferably, the authenticator for the other session is authenticated before the device logs on, so that only the key exchange occurs; otherwise, the authentication server would also authenticate the authenticator for the other session before sending the key.

At 516, the session key corresponding to the session key for the device's original authenticator and the session key corresponding to the session key sent to the authenticator for the other session are sent to the device. In a preferred embodiment, the keys are sent at the same time to reduce the number of communications between the device and the authentication server. However, even if the keys are sent separately, the present invention still provides a benefit over prior art systems because the device does not have to perform authentications with the authenticator of the other session, which would entail additional communications between the authenticator of the other session, the authentication server and the device.

It should be noted that steps 512-516 are executed for each session. For multiple sessions they may be executed concurrently.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method to optimize authenticated multi-session establishment for a single supplicant, comprising:
   authenticating the supplicant with an authentication server using an authenticator of the supplicant, wherein the supplicant is a wireless access point, the authenticator is a switch port coupling the access point to a backbone network coupling the switch port to the authentication server;
   determining by the authentication server at least one other session for the supplicant;
   initiating by the authentication server the at least one other session for the supplicant with an authenticator for the at least one other session, wherein a one of the at least one other session is established as a session between a wireless domain server and the access point;
   distributing a first session key by the authentication server to the switch port for establishing a session between the access point and the switch port;
   the initiating the at least one other session with the wireless domain server further comprises distributing a second session key by the authentication server to the wireless domain server; and
   distributing a set of keys to the access point by the authentication server;
   wherein the set of keys comprises a first key corresponding to the first session key and a second key corresponding to the second session key.

2. A method according to claim 1, wherein the determining at least one other session further comprises sending a list of the at least one other session from the supplicant to the authentication server.

3. A method according to claim 1, wherein the determining at least one other session further comprises determining that the supplicant is authorized to be initiated with the at least one other session.

4. A method according to claim 1, wherein the determining at least one other session further comprises retrieving a database entry for the supplicant by the authentication server from a database accessible to the authentication server.

5. A method according to claim 1, wherein the at least one other session is authenticated with the authentication server before the supplicant is authenticated.

6. A system, comprising:
   means for authenticating a supplicant with an authentication server using an authenticator of the supplicant, wherein the supplicant is a wireless access point, the authenticator is a switch port coupling the access point to a backbone network coupling the switch port to the authentication server;
   means for determining by the authentication server at least one other session for the supplicant;
   means for initiating by the authentication server the at least one other session for the supplicant by the authentication server with an authenticator for the at least one other session, wherein the one of the at least one other session is established with a wireless domain server for the access point;
   means for distributing a first session key by the authentication server to the switch port for establishing a session between the access point and the switch port;
   the means for initiating the at least one other session with the wireless domain server further comprises means for distributing a second session key by the authentication server to the wireless domain server; and
   means for distributing a set of keys to the access point by the authentication server;
   wherein the set of keys comprises a first key corresponding to the first session key and a second key corresponding to the second session key.

7. A system according to claim 6, wherein the means for determining at least one other session further comprises means for sending a list of the at least one other session from the supplicant to the authentication server.

8. A system according to claim 6, wherein the means for determining at least one other session further comprises means for retrieving a database entry for the supplicant by the authentication server from a database accessible to the authentication server.

9. A system according to claim 6, wherein the means for initiating at least one other session further comprises:
   means for distributing a first key for the at least one other session to an authenticator of the at least one other session; and
   means for distributing a second key corresponding to the first key for the at least one other session to the supplicant.

* * * * *